United States Patent [19]
Saito et al.

[11] Patent Number: 5,565,512
[45] Date of Patent: Oct. 15, 1996

[54] FLUORINE-CONTAINING ELASTOMER COMPOSITION

[75] Inventors: Satoru Saito, Kitaibaraki; Futoshi Kumiya; Haruyoshi Tatsu, both of Hitachi, all of Japan

[73] Assignee: Nippon Mektron, Limited, Tokyo, Japan

[21] Appl. No.: 620,435

[22] Filed: Mar. 22, 1996

[30] Foreign Application Priority Data

Mar. 31, 1995 [JP] Japan .................................. 7-099655
Aug. 11, 1995 [JP] Japan .................................. 7-227017
Nov. 30, 1995 [JP] Japan .................................. 7-336103

[51] Int. Cl.⁶ ..................................... C08F 8/30
[52] U.S. Cl. ............... 525/340; 525/326.3; 525/341; 525/353; 525/359.3; 525/374; 525/378; 525/379; 525/359.4
[58] Field of Search ..................... 525/340, 341, 525/353, 359.3, 359.4, 374, 378, 379

[56] References Cited

U.S. PATENT DOCUMENTS 3,114,778 12/1963 Fritz et al. .
3,546,186 12/1970 Gladding et al. .
3,852,326 12/1974 Nottke .
3,933,767 1/1976 Nottke .
4,138,426 2/1979 England .
4,281,092 7/1981 Breazeale .

FOREIGN PATENT DOCUMENTS 59-109546 6/1984 Japan .
63-5409 of 1988 Japan .

Primary Examiner—Bernard Lipman
Attorney, Agent, or Firm—Kenyon & Kenyon

[57] ABSTRACT

A fluorine-containing elastomer composition comprising a terpolymer of tetrafluoroethylene, perfluoro(lower alkyl vinyl ether) and cyano group-containing (perfluorovinylether), and a less expensive of the ammonium salt of organic or inorganic acid as a curing agent produce a vulcanization product having good heat resistance and solvent resistance, and when no carbon black, etc. are contained in the composition for curing, transparent vulcanization product having satisfactory physical properties are obtainable.

6 Claims, No Drawings

FLUORINE-CONTAINING ELASTOMER COMPOSITION

BACKGROUND OF THE INVENTION

1. Field of the Invention

The present invention relates to a fluorine-containing elastomer composition, and more particularly to a cross-linkable composition of fluorine-containing elastomer having cyano groups as cross-linkable groups.

2. Related Prior Art

JP-A-59-109546 discloses a fluorine-containing elastomer composition comprising a terpolymer of tetrafluoroethylene, perfluoro(methyl vinyl ether) and cyano group-containing (perfluorovinylether) represented by the following general formula:

$$CF_2=CF[OCF_2CF(CF_3)]nO(CF_2)mCN$$

wherein n is an integer of 1 to 2 and m is an integer of 1 to 4, and a bis(aminophenyl) compound represented by the following general formula as a cross-linking agent:

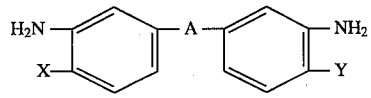

wherein A is an alkylidene group having 1 to 6 carbon atoms, a perfluoroalkylidene group having 1 to 10 carbon atoms, $SO_2$ group, O group, CO group or a carbon-carbon bond capable of directly bonding two benzene rings, and X and Y each are hydroxyl group or amino group. However, the bis(diamino-phenyl) compound or bis(aminophenol) compound is expensive for the industrial scale application.

JP-A-55-98212 discloses use for tetraphenyl tin as a curing agent for such a fluorine-containing elastomer having cyano groups, but the tetraphenyl tin is toxic and its use is not preferable.

SUMMARY OF THE INVENTION

An object of the present invention is to provide a fluorine-containing elastomer composition capable of producing vulcanization products having a good resistance to a solvent, which comprises a less expensive compound than a bis(diaminophenyl) compound or bis(aminophenol) compound as a curing agent for a fluorine-containing elastomer having cyano groups as cross-linkable groups.

According to the present invention, there is provided a fluorine-containing elastomer composition, which comprises a terpolymer of tetrafluoroethylene, perfluoro(lower alkyl vinyl ether) and a cyano group-containing (perfluorovinylether), and an ammonium salt of organic or inorganic acid as a curing agent.

DETAILED DESCRIPTION OF THE INVENTION

Terpolymers of tetrafluoroethylene, perfluoro(lower alkyl vinyl ether) and cyano group-containing (perfluorovinylether) for use in the present invention includes, for example, terpolymers comprising 50 to 75% by mole of tetrafluoroethylene, 49.8 to 25% by mole of perfluoro(lower alkyl vinyl ether) or perfluoro-(lower alkoxy-lower alkyl vinyl ether) and 0.2 to 5% by mole of cyano group-containing (perfluorovinylether) as a cross-linking site monomer, sum total being 100% by mole.

Perfluoro(lower alkyl vinyl ether) for use in the present invention includes, for example, perfluoro(methyl alkyl vinyl ether).

Cyano group-containing (perfluorovinylether) serving to form cross-linkable groups in the terpolymer includes, for example, the following compounds:

(a) $CF_2=CFO(CF_2)_n CN$
   (n: an integer of 2 to 12)
   [as disclosed in U.S. Pat. Nos. 3,546,186; 3,114,778]

(b) $CF_2=CFO[CF_2CF(CF_3)O]CF_2CF(CF_3)CN$
   (n: 0 or an integer of 1 to 4)
   [as disclosed in U.S. Pat. Nos. 3,852,326; 3,933,767]

(c) $CF_2=CFO[CF_2CF(CF_3)O]_m(CF_2)_nCN$
   (n: an integer of 1 to 4; m: an integer of 1 to 2)
   [as disclosed in U.S. Pat. Nos. 4,138,426; 4,281,092]

(d) $CF_2=CFO(CF_2)_nOCF(CF_3)CN$
   (n: an integer of 2 to 4)
   [as disclosed in Japanese Patent Application No. 6-295548]

The above-mentioned cyano group-containing (perfluorovinylether) compound (d) can be synthesized, for example, through the following reaction route:

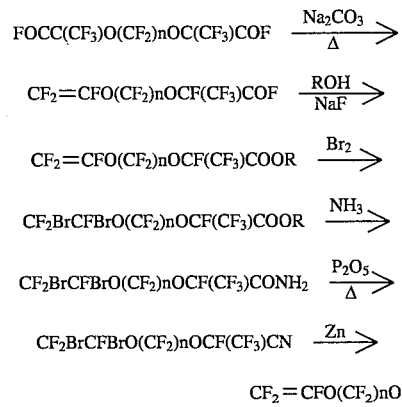

(n: an integer of 2 to 4)

$$CF_2=CFO(CF_2)nOCF(CF_3)CN$$

As given by the foregoing reaction route, oxalyl difluoride, perfluoromalonyl difluoride or perfluorosuccinyl difluoride is subjected to addition reaction with 2 equivalent of hexafluoropropylene oxide in the presence of a cesium fluoride catalyst, and the resulting addition reaction product is thermally decomposed in the presence of sodium carbonate to obtain a monovinyl compound. Then, the monovinyl compound is esterified through reaction with an alcohol such as methanol in the presence of a HF trapping agent such as sodium fluoride, followed by addition of bromine to the double bond to protect it and by reaction with ammonia to amidize the protected compound. Then, the amide compound is dehydrated in the presence of phosphorus pentoxide with heating to cyanize the compound. Finally the cyano compound is subjected to debromination reaction in the presence of zinc to obtain the desired cyano group-containing (perfluorovinylether) compound (d).

The terpolymer can be further copolymerized with fluoroolefins, olefins or vinyl compounds to such a degree as not to inhibit the copolymerization reaction or deteriorate physical properties of vulcanization products, for example, not more than about 20% by mole on the basis of the terpolymer. Fluoroolefins include, for example, vinylidene fluoride, monofluoroethylene, trifluoroethylene, trifluoropropylene, pentafluoropropylene, hexafluoropropylene, hexafluoroisobutylene, chlorotrifuoroethylene, dichlorodifluoroethylene, etc. Olefins or vinyl compounds include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc.

Curing agent for use in the present invention includes, for example, the following compounds:

(1) Ammonium polyfluorocarboxylates:

F(CF$_2$)nCOONH$_4$ (n: an integer of 1 to 20)

F(CF$_2$)nO[CF(CF$_3$)CF$_2$O]mCF(CF$_3$)COONH$_4$ (n: an integer of 1 to 5; m: an integer of 1 to 5)

CF$_3$CF(CF$_3$)O[CF(CF$_3$)CF$_2$O]nCF(CF$_3$)COONH$_4$ (n: 0 or an integer of 1 to 5)

H$_4$NOOC(CF$_2$)nCOONH$_4$ (n: 0 or an integer of 1 to 10)

H$_4$NOOCFC(CF$_3$)[OCF$_2$CF(CF$_3$)]qO(CF$_2$)pO[CF(CF$_3$)CF$_2$O]rCF(CF$_3$)COONH$_4$ (p: an integer of 1 to 10; q, r: an integer of 1 to 5)

H$_4$NOOC(CF$_2$)nO[CF(CF$_3$)CF$_2$O]mCF(CF$_3$)COONH$_4$ (n: an integer of 1 to 10; m: 0 or an integer of 1 to 5)

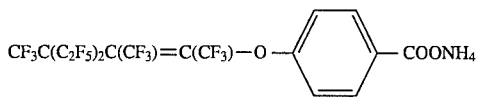

F(CF$_2$)nSO$_2$NRCF$_2$COONH$_4$ (R: alkyl groups having C$_1$ to C$_{20}$; n: an integer of 1 to 20)

(2) Ammonium polyfluorosulfonates:

F(CF$_2$)nSO$_3$NH$_4$ (n: an integer of 1 to 20)

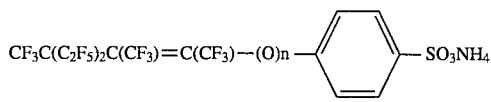

(n: 0 or 1)

RfCH$_2$CH$_2$SO$_3$NH$_4$

Rf(CH$_2$CH$_2$O)nSO$_3$NH$_4$ (n: 1 or 2)

wherein
Rf: perfluoroalkyl groups having C$_1$ to C$_{20}$ which can contain an ether bond therein.

(3) Ammonium polyfluoroalkyl group-containing phosphates, phosphonates or sulfonates:

(RfCH$_2$CH$_2$O)$_n$PO(ONH$_4$)$_{3-n}$ (n: 1 or 2)

-continued (RfSO$_2$NRCH$_2$CH$_2$)$_n$PO(ONH$_4$)$_{3-n}$ (n: 1 or 2)

RfCH$_2$CH$_2$PO(ONH$_4$)$_2$

RfCH$_2$CH$_2$PO(OR)(ONH$_4$)

-continued

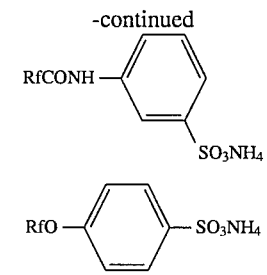

wherein
Rf: perfluoroalkyl groups having C$_1$ to C$_{20}$ which can contain an ether bond;
R: a lower alkyl group.

(4) Ammonium carboxylates or sulfonates:

RCOONH$_4$

H$_4$NOOCRCOONH$_4$

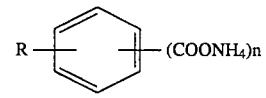

(n: an integer of 1 to 4)

RSO$_3$NH$_4$

-continued $H_4NSO_3RSO_3NH_4$

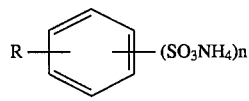

(n: an integer of 1 to 4)

$ROSO_3NH_4$ wherein
R: hydrogen atom or an alkyl or alkylene group having $C_1$ to $C_{30}$.

(5) Ammonium phosphates or phosphonates:
$ROPO(ONH_4)_2$
$RPO(ONH_4)_2$
$RR'PO(ONH_4)$
$ROP(ONH_4)_2$
$(RO)(R'O)P(ONH_4)$ wherein R and R': alkyl groups having $C_1$ to $C_{30}$.

(6) Ammonium salts of inorganic acids:
  Ammonium sulfate
  Ammonium carbonate
  Ammonium nitrate
  Ammonium phosphate In view of dispersibility in the fluorine-containing elastomer and physical properties of vulcanization products, ammonium salts of organic acids, particularly ammonium polyfluorocarboxylates, are preferably used among the foregoing ammonium salts.

About 0.2 to about 5 parts by weight, preferably about 0.5 to about 3 parts by weight, of the ammonium salt of organic or inorganic acid is added to 100 parts by weight of the terpolymer.

The fluorine-containing elastomer composition comprising the above-mentioned essential components can further contain an inorganic filler such as carbon black, silica, etc.; oxides or hydroxides of divalent metal such as lead oxide (PbO), zinc oxide, magnesium oxide, calcium hydroxide, etc.; acid receptor such as stearate, hydrotalcite, etc.; pigments; processing aids; plasticizers; and other necessary additives, when desired. The composition can be prepared by kneading at about 30° to about 100° C. by roll, kneader, Bambury mixer or the like. Curing of the composition is carried out by heating at about 150° to about 220° C. for about 5 to about 60 minutes in a compression molding machine, etc. Secondary vulcanization can be carried out in air or in a nitrogen gas atmosphere at about 200° to about 300° C. for about 10 to about 50 hours.

Fluorine-containing elastomer having cyano groups as cross-linkable groups can be cured by an ammonium salt of organic or inorganic acid, which is less expensive than bis (diaminophenyl) compound or bis(aminophenyl) compound, and the resulting vulcanization products have good resistance to heat and solvents. When no carbon black, etc. are contained in the curable composition, transparent vulcanization products having satisfactory physical properties can be obtained by curing. When an ammonium salt, which is readily releasable or deposable at the secondary vulcanization, is used, the resulting vulcanization products generate much less gas or contain much less solvent-extractable components and thus the present composition has an expected effective use in the medical field, the food industry, the semiconductor industry, etc.

PREFERRED EMBODIMENTS OF THE INVENTION

The present invention will be explained in detail below, referring to Examples and Reference Examples.

EXAMPLES 1 AND 2

One part by weight (Example 1) or two parts by weight (Example 2) of ammonium perfluorooctanoate $CF_3(CF_2)_6COONH_4$ was added to 100 parts by weight of terpolymer A of tetrafluoroethylene/perfluoro(methyl vinyl ether)/perfluoro(5-cyanopentyl vinyl ether) [molar ratio: 68.0/30.0/1.2] and kneaded through a double roll mill. The resulting mixture was compression molded at 180° C. for 30 minutes and then subjected to secondary vulcanization in air under the following conditions:

| Example 1 | Example 2 |
|---|---|
| Heating at 90° C. for 4 hours | Heating at 90° C. for 4 hours |
| Heating to 204° C. over 6 hours | Heating to 204° C. over 6 hours |
| Heating at 204° C. for 18 hours | Heating at 204° C. for 18 hours |
| Heating to 270° C. over 6 hours | Heating to 288° C. over 6 hours |
| Heating at 270° C. for 18 hours | Heating at 288° C. for 18 hours |

The resulting secondary vulcanization products had such appearances as slightly greyish transparent one (Example 1) and colorless, transparent one (Example 2).

EXAMPLES 3 TO 6

One part by weight (Examples 3 and 4), 1.5 parts by weight (Example 5) or 2 parts by weight (Example 6) of ammonium perfluorooctanoate was added to 100 parts by weight of terpolymer B of tetrafluoroethylene/perfluoro(methyl vinyl ether)/perfluoro(2-cyano-3,7-dioxa-8-nonene) [molar ratio: 72.1/25.5/2.4] and kneaded through a double roll mill. The resulting mixture was compression molded at 180° C. for 30 minutes and then subjected to secondary vulcanization in air under the following conditions:

| Example 3 | Example 4 to 6 |
|---|---|
| Heating at 90° C. for 4 hours | Heating at 90° C. for 4 hours |
| Heating to 204° C. over 6 hours | Heating to 204° C. over 6 hours |
| Heating at 204° C. for 18 hours | Heating at 204° C. for 18 hours |
| Heating to 270° C. over 6 hours | Heating to 288° C. over 6 hours |
| Heating at 270° C. for 18 hours | Heating at 288° C. for 18 hours |

The resulting secondary vulcanization products all had a transparent, bright amber appearance.

EXAMPLES 7 AND 8

One part by weight (Example 7) or two parts by weight (Example 8) of ammonium perfluoro(5,8-dimethyl-4,7-dioxanonanoate) $CF_3(CF_2)_2OCF(CF_3)CF_2OCF(CF_3)COONH_4$ was added to 100 parts by weight of the above-mentioned terpolymer B and kneaded through a double roll mill. The resulting mixture was compression molded at 180° C. for 30 minutes and then subjected to secondary vulcanization in air under the same conditions as in Example 2.

The resulting secondary vulcanization products all had a colorless, transparent appearance.

Reference Examples 1 and 2

0.5 parts by weight (Reference Example 1) or one part by weight (Reference Example 2) of 2,2-bis(3-amino-4-hydroxyphenyl)hexafluoropropane was added to 100 parts by weight of the above-mentioned terpolymer B and kneaded through a double roll mill. The resulting mixture was compression molded at 180° C. for 30 minutes and then subjected to secondary vulcanization in air under the same conditions as in Example 2.

The resulting secondary vulcanization products all had a reddish brown, opaque appearance.

The vulcanization products obtained in Examples 1 to 3 were subjected to the following tests:

Normal state physical properties:
  Hardness test according to DIN 53505
  Tensile test according to DIN 53504 (100% modulus, tensile strength and elongation)
Heat ageing test: normal state physical properties after ageing at 200° C. for 70 hours in air.
Compression set: ASTM Method-B/P-24 O-ring
Solvent-resistant test: volumic swelling ratio (%) after dipping in a solvent at a given temperature for 70 hours.

Test results are shown in the following Table 1.

TABLE 1

| Properties | | Ex. 1 | Ex. 2 | Ex. 3 |
|---|---|---|---|---|
| [Normal state physical properties] | | | | |
| Hardness | (JIS-A) | 63 | 61 | 59 |
| 100% modulus | (MPa) | 2.5 | 2.6 | 2.5 |
| Tensile strength | (MPa) | 22.2 | 21.0 | 17.8 |
| Elongation | (%) | 270 | 270 | 280 |
| [Heat ageing test] | | | | |
| Hardness | (JIS-A) | 63 | 62 | 60 |
| 100% modulus | (MPa) | 2.6 | 2.5 | 2.2 |
| Tensile strength | (MPa) | 21.3 | 17.0 | 16.2 |
| Elongation | (%) | 259 | 250 | 270 |
| [Compression set] | | | | |
| 150° C. for 70 hrs | (%) | 36 | 34 | 39 |
| 200° C. for 70 hrs | | | 37 | 40 | 49 |
| [Solvent resistant; %] | (%) | | | |
| Hexamethylenediamine at 140° C. | | | +23.4 | +13.8 |
| Steam at 200° C. | | | +0.9 | +1.4 |
| Methyl ethyl ketone at 80° C. | | | | +4.5 |
| Methanol at 65° C. | | | | +0.9 |
| Ethyl acetate at 80° C. | | | | +5.5 |
| 30% sodium hydroxide at 80° C. | | | | +0.1 |
| 60% nitric acid at 80° C. | | | | +0.7 |

The vulcanization products obtained in Examples 4 to 8 and Reference Examples 1 to 2 were subjected to determination of compression set and solvent resistance.

The results are shown in the following Table 2.

TABLE 2

| | Compression set (%) | | Solvent resistance (%) | |
|---|---|---|---|---|
| Example | 150° C., 70 hrs | 200° C., 70 hrs | $H_2N(CH_2)_4NH_2$ (140° C.) | Steam (200° C.) |
| Ex. 4 | 52 | 55 | +21.6 | +0.3 |
| Ex. 5 | 30 | 33 | +23.6 | +1.6 |
| Ex. 6 | 17 | 20 | +17.3 | −0.1 |
| Ex. 7 | 66 | 66 | +22.7 | +1.4 |
| Ex. 8 | 25 | 27 | +22.9 | +0.7 |
| Ref. Ex. 1 | 26 | 21 | +28.6 | +0.5 |
| Ref. Ex. 2 | 14 | 14 | +39.4 | +0.8 |

EXAMPLES 9 AND 10

One part by weight of triammonium phosphate (Example 9) or one part by weight of ammonium benzoate (Example 10) was added to 100 parts by weight of the above-mentioned terpolymer A and kneaded through a double roll mill. The resulting mixture was compression molded at 180° C. for 30 minutes and then subjected to secondary vulcanization in air under the same conditions as in Example 2.

EXAMPLES 11 TO 14

One part by weight of ammonium carbonate (Example 11), one part by weight of triammonium phosphate (Example 12), one part by weight of diammonium adipate (Example 13) or one part by weight of ammonium benzoate (Example 14) was added to 100 parts by weight of the above-mentioned terpolymer B and kneaded through a double roll mill. The resulting mixture was compression molded at 180° C. for 30 minutes and then subjected to secondary vulcanization in air under the same conditions as in Example 2.

The vulcanization products obtained in Examples 9 to 14 were subjected to observation of appearance, determination of compression set and solvent resistance test. The results are shown in the following Table 3.

TABLE 3

|     | Product appearance | Compression set (%) | | Solvent resistance (%) | |
| --- | --- | --- | --- | --- | --- |
| Ex. |  | 150° C., 70 hrs | 200° C., 70 hrs | $H_2N(CH_2)_6NH_2$ (140° C.) | Steam (200° C.) |
| 9  | Reddish brown | 80 | 78 | 20.1 | 4.8 |
| 10 | Slight yellow, transparent | 52 | 47 | 33.5 | 3.6 |
| 11 | Colorless, transparent | 75 | 74 | 13.5 | 4.6 |
| 12 | Reddish brown | 10 | 12 | 23.4 | 20.9 |
| 13 | Brown | 27 | 28 | 11.0 | 1.6 |
| 14 | Amber, transparent | 46 | 54 | 15.9 | 1.1 |

What is claimed is:

1. A fluorine-containing elastomer composition, which comprises a terpolymer of tetrafluoroethylene, perfluoro(lower alkyl vinyl ether) and cyano group-containing (perfluorovinylether), and an ammonium salt of organic or inorganic acid as a curing agent.

2. A fluorine-containing elastomer composition according to claim 1, wherein the terpolymer is a terpolymer of tetrafluoroethylene, perfluoro(methyl vinyl ether) and $CF_2=CFO(CF_2)nCN$, wherein n is an integer of 2 to 12, or $CF_2=CFO[CF_2CF(CF_3)O]nCF_2CF(CF_3)CN$, wherein n is 0 or an integer of 1 to 4, $CF_2=CFO[CF_2CF(CF_2)O]m(CF_2)nCN$, wherein n is an integer of 1 to 4 and m is an integer of 1 to 2, or $CF_2=CFO(CF_2)nOCF(CF_3)CN$, wherein n is an integer of 2 to 4.

3. A fluorine-containing elastomer composition according to claim 1, wherein the terpolymer is a terpolymer comprising 50 to 75% by mole of tetrafluoroethylene, 49.8 to 25% by mole of perfluoro(lower alkyl vinyl ether) and 0.2 to 5% by mole of cyano group-containing (perfluorovinylether), sum total being 100% by mole.

4. A fluorine-containing elastomer composition according to claim 1, wherein the ammonium salt of organic acid is an ammonium polyfluorocarboxylate, an ammonium polyfluorosulfonate, an ammonium polyfluoroalkyl group-containing phosphate, phosphonate or sulfonate, ammonium carboxylate or sulfonate, or an ammonium phosphate or phosphonate.

5. A fluorine-containing elastomer composition according to claim 1, wherein the ammonium salt of inorganic acid is ammonium sulfate, ammonium carbonate, ammonium nitrate or ammonium phosphate.

6. A fluorine-containing elastomer composition according to claim 1, wherein 0.2 to 5 parts by weight of the ammonium salt of organic or inorganic acid is used per 100 parts by weight of the terpolymer.

* * * * *

UNITED STATES PATENT AND TRADEMARK OFFICE
CERTIFICATE OF CORRECTION

PATENT No. : 5,565,512

DATED : October 15, 1996

INVENTOR(S): Saito et al.

It is certified that error appears in the above-identified patent and that said Letters Patent is hereby corrected as shown below:

In column 2, line 10, change "...O]CF$_2$..." to --...O]$_n$CF$_2$--;

In column 2, line 24, change "...)$_{n-2}$" to --...)$_{n-2}$--;

In column 3, line 4, change "ethylene." to --ethylene,--;

In column 8, line 10, change "...(CH$_2$)$_4$" to --...(CH$_2$)$_6$--;

In column 9, line 29, change " CF$_2$=CFO[CF$_2$CF(CF$_2$)O]m(CF$_2$)nCN" to --CF$_2$=CFO[CF$_2$ CF(CF$_3$)O]m(CF$_2$)nCN--.

Signed and Sealed this

Thirteenth Day of May, 1997

BRUCE LEHMAN

*Attest:*

*Attesting Officer*  *Commissioner of Patents and Trademarks*